US012568445B2

(12) United States Patent
Kalavakuru et al.

(10) Patent No.: US 12,568,445 B2
(45) Date of Patent: Mar. 3, 2026

(54) WIRELESS LOCAL AREA NETWORK ACCESS POINT SYSTEM CONFIGURATION AND POWER IMPROVEMENT

(71) Applicant: Cisco Technology, Inc., San Jose, CA (US)

(72) Inventors: Sivadeep Reddy Kalavakuru, Akron, OH (US); Ardalan Alizadeh, Milpitas, CA (US); John Martin Blosco, Norton, OH (US); Aaron Patrick Tondra, Massillon, OH (US)

(73) Assignee: Cisco Technology, Inc.

( * ) Notice: Subject to any disclaimer, the term of this patent is extended or adjusted under 35 U.S.C. 154(b) by 613 days.

(21) Appl. No.: 18/046,525

(22) Filed: Oct. 14, 2022

(65) Prior Publication Data

US 2024/0129862 A1 Apr. 18, 2024

(51) Int. Cl.
| | |
|---|---|
| *H04W 52/34* | (2009.01) |
| *H04W 52/36* | (2009.01) |
| *H04L 12/10* | (2006.01) |
| *H04W 84/12* | (2009.01) |

(52) U.S. Cl.
CPC ....... *H04W 52/346* (2013.01); *H04W 52/367* (2013.01); *H04L 12/10* (2013.01); *H04W 84/12* (2013.01)

(58) Field of Classification Search
CPC . H04W 52/367; H04W 52/346; H04W 84/12; H04W 52/34; H04W 52/36
See application file for complete search history.

(56) References Cited

U.S. PATENT DOCUMENTS

| | | | |
|---|---|---|---|
| 8,793,511 B1 * | 7/2014 | Bishara ................... | H04L 12/10 |
| | | | 713/320 |
| 9,900,164 B2 * | 2/2018 | Spiel ..................... | G06F 1/3206 |
| 10,785,704 B1 | 9/2020 | Emmanuel et al. | |
| 2010/0211806 A1 | 8/2010 | Diab et al. | |
| 2019/0123702 A1 | 4/2019 | Trainor et al. | |
| 2022/0094072 A1 | 3/2022 | Kalavakuru et al. | |
| 2022/0116235 A1 | 4/2022 | Emnohazy et al. | |

* cited by examiner

*Primary Examiner* — Tuan H Nguyen

(74) *Attorney, Agent, or Firm* — Merchant & Gould. P.C.

(57) ABSTRACT

Automatically changing Access Point (AP) system configurations for Power over Ethernet (PoE) adaptation and Radio Frequency (RF) power improvement on band edge channels, particularly for Wireless Local Area Networks (WLAN) may be provided. A PoE budget for an AP may be determined. Then, an evaluation of inputs associated with the AP may be performed. The evaluation may include determining an entity input from an entity associated with the AP, determining a client input from a client interfacing with the AP, and/or determining a device input from the AP. Next, a configuration of the AP may be determined based on the PoE budget and the entity input, the client input, and/or the device input. The operation of the AP may be altered based on the configuration.

20 Claims, 9 Drawing Sheets

300

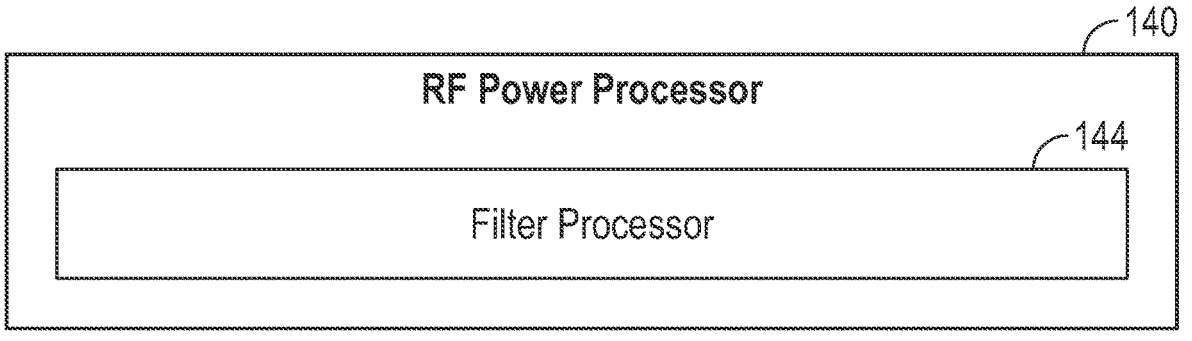
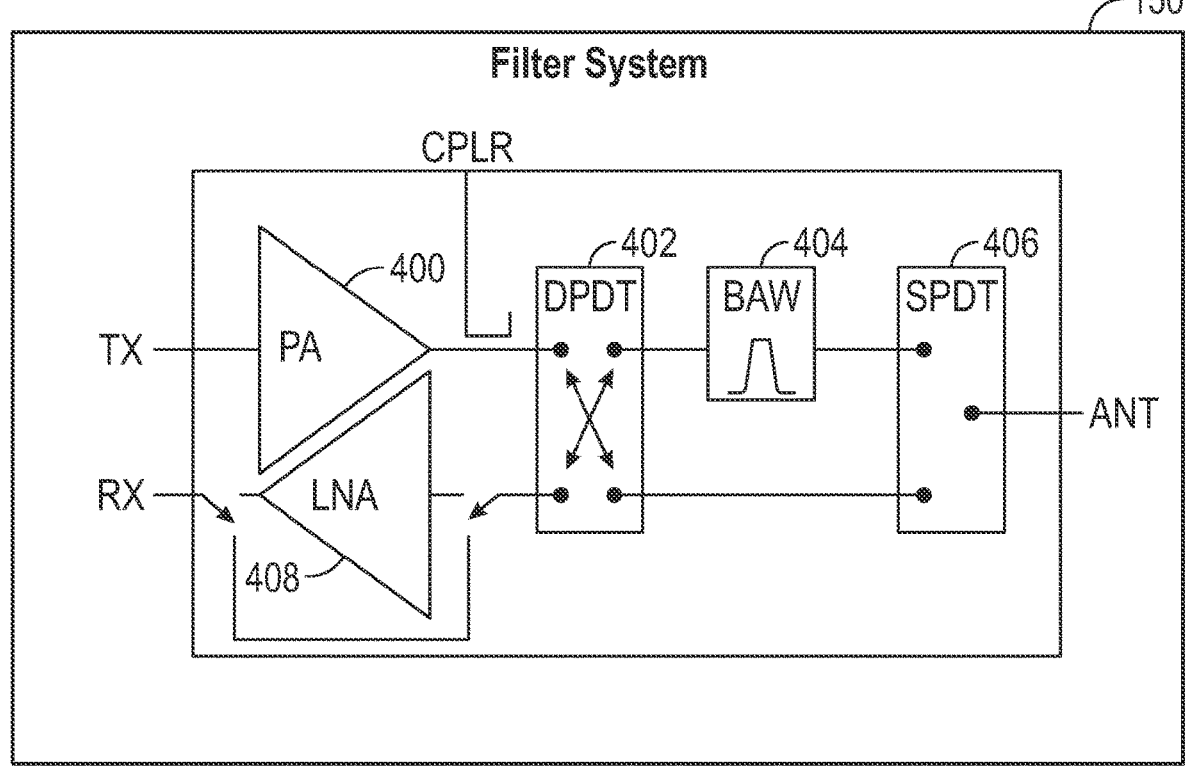
FIG. 4

600

605
Periodic trigger
for computation

RRM flagship
features enabled
(sec 2-1)

610
For each client
per radio

615
For each data rate
supported by client

620
Phase1 link
budget calculation

625
Phase2 client
grouping near/far

630
Phase3 scheduler
duty cycle

635
Phase4 radio config
level adaptation

640
All rates for this client
Proceed to next client

645
All clients done

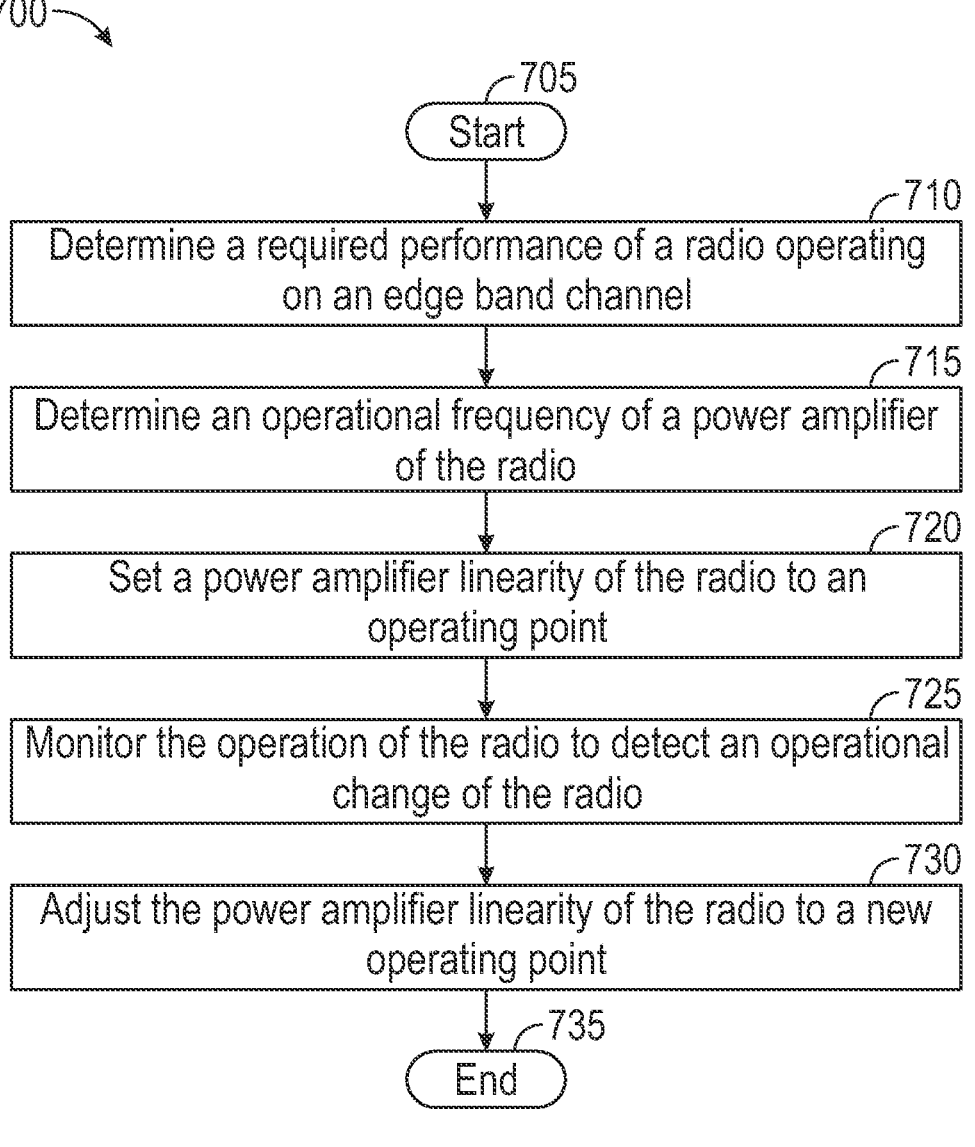

700

705
Start

710
Determine a required performance of a radio operating on an edge band channel 715
Determine an operational frequency of a power amplifier of the radio 720
Set a power amplifier linearity of the radio to an operating point 725
Monitor the operation of the radio to detect an operational change of the radio 730
Adjust the power amplifier linearity of the radio to a new operating point 735
End

FIG. 7

WIRELESS LOCAL AREA NETWORK ACCESS POINT SYSTEM CONFIGURATION AND POWER IMPROVEMENT

TECHNICAL FIELD

The present disclosure relates generally to providing automatically changing Access Point (AP) system configurations and to providing power improvement on band edge channels, particularly for Wireless Local Area Networks (WLAN).

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings:

FIG. 4 is a block diagram of a Radio Frequency (RF) power processor and a filter system for providing power improvement on band edge channels;

FIG. 7 is a flow chart of a method for providing power improvement on edge band channels;

DETAILED DESCRIPTION

Overview

Figure 1:
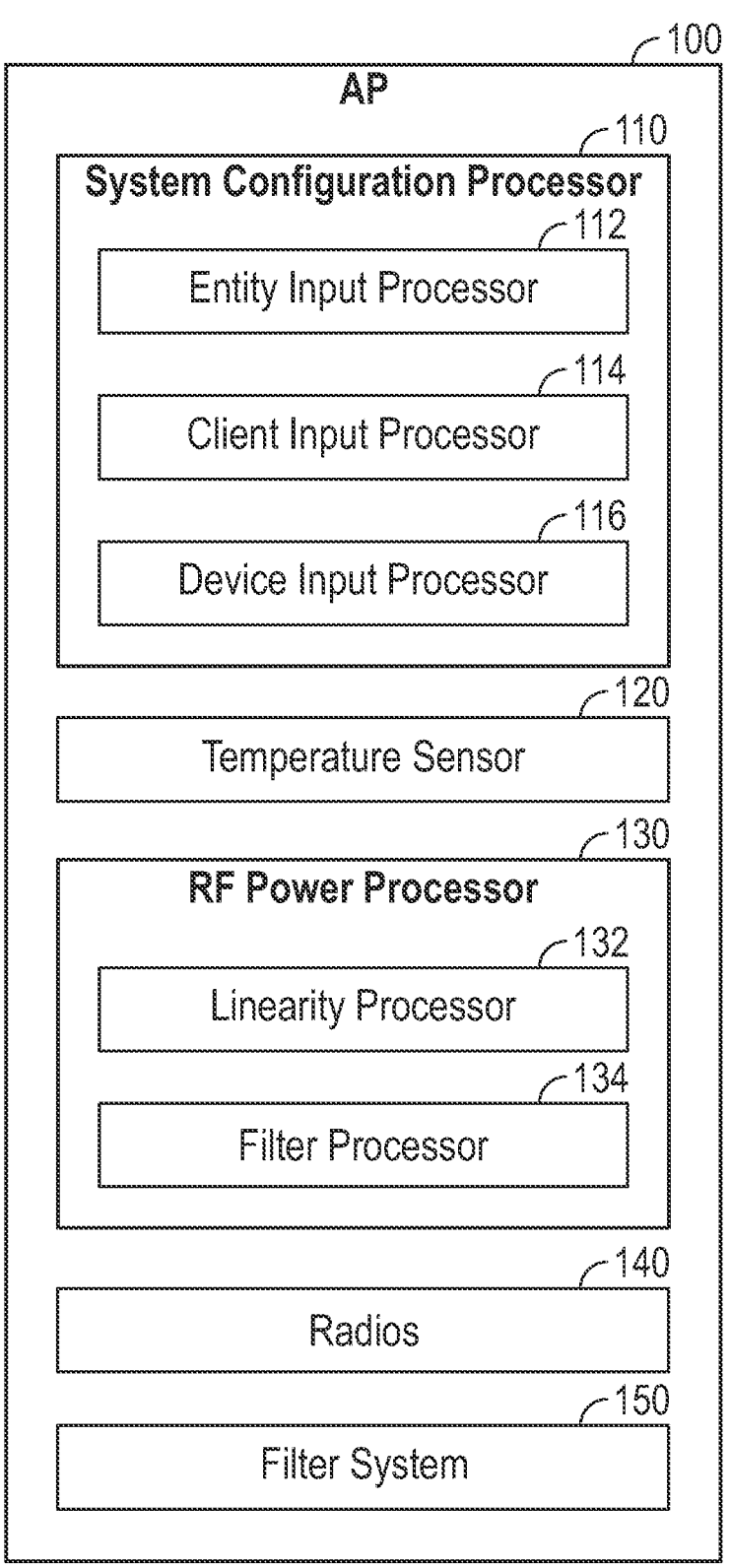
FIG. 1 is a block diagram of an Access Point (AP) for providing automatically changing AP system configurations and for providing power improvement on band edge channels.

Automatically changing Access Point (AP) system configurations for Power over Ethernet (PoE) adaptation and Radio Frequency (RF) power improvement on band edge channels, particularly for Wireless Local Area Networks (WLAN) may be provided. A PoE budget for an AP may be determined. Then, an evaluation of inputs associated with the AP may be performed. The evaluation may include determining an entity input from an entity associated with the AP, determining a client input from a client interfacing with the AP, and/or determining a device input from the AP. Next, a configuration of the AP may be determined based on the PoE budget and the entity input, the client input, and/or the device input. The operation of the AP may be altered based on the configuration.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Access Points (APs) may be required to support a mode of operation with a system power draw of less than 51 W-60 W to support the Institute of Electrical and Electronics Engineers (IEEE) 802.3bt standard, 25.5 W to support the IEEE 802.3at standard, and 13.8 W to support the IEEE 802.3af standard Power over Ethernet (PoE) budgets at Power Delivery (PD). In general, most of an AP's features may be enabled at the 802.3bt PoE budget. Certain AP features (e.g., a Universal Serial Bus (USB) component, an External (Ext) module port, and the number of radio Transmit (TX) chains) may be disabled and/or downgraded to operate under an IEEE 802.3af or IEEE 802.3at PoE budget based on a predefined static policy. Many network customers may use legacy switches and configurations that restrict APs to operate under IEEE 802.3at PoE. Thus, AP system configurations may be limited based on worst case DC power draw numbers that may cause APs to operate with sub-optimal AP features due to the requirement to disable AP features to operate under IEEE 802.3at PoE. Accordingly, embodiments of the disclosure may provide automatically changing AP system configurations to provide more AP features while operating under power restrictions.

With the advent of IEEE 802.11ax and IEEE 802.11be, APs may support up to 16 transmitting antennas. A higher number of antennas may improve transmit and receive diversity. However, there may be limits on the number of antennas and band edge channel power that may be used. Band edges may be the highest channel and lowest channel available in the band. APs may have to limit the transmit power per chain and band edge channel power due to regulatory limits (e.g., restricted band limits for band edge, the antenna array gain rule for unintentional beamforming). For example, if the regulatory domain allows for maximum transmission at 23 decibel milliwatts (dBm), 17 dBm per path, for a certain band, then the per path transmit power on band edge channels may need to be limited to 12-14 dBm to meet the restricted band limit (e.g., the Federal Communications Commission (FCC) limit: −41.25 dBm+Number of path/chains+Antenna Gain), the European Telecommunications Standards Institute (ETSI) limit: −30 dBm/1 MHz). Moreover, APs with external antenna (higher antenna gain for Large Public Venue (LPV) or high density) may require further limiting of the band edge channel power (e.g., 5-10 dB lower per path) depending on how high the external antenna gain is. In general, Radio Frequency (RF) performance and the capacity of deployment may suffer when APs are configured on band edge channels, especially if the APs are deployed in a honeycomb structure and especially on bands with a lower availability of spectrum (e.g., a 2.4 GHz band). This may result in connectivity issues and suboptimal performance for some clients in a network, such as a Wireless Local Area Network (WLAN). Accordingly, embodiments of the disclosure may provide for improving AP TX power on band edge channels.

FIG. 1 is a block diagram of an AP 100 for providing automatically changing AP system configurations and for providing power improvement on band edge channels. The AP may include a system configuration processor 110, a temperature sensor 120, a RF power processor 130, one or more radios 140, and a filter system 150. The system configuration processor 110 may include an entity input processor 112, a client input processor 114, and a device input processor 116. The RF power processor 130 may include a linearity processor 132, and a filter processor 134.

AP System Configuration

The system configuration processor 110 may automatically configure the AP 100 to operate according to power restrictions, such as a PoE budget. The system configuration processor 110 may configure the AP 100 by altering the operation of features of the AP 100 (e.g., enabling, disabling, upgrading, and/or downgrading AP features). For example, the system configuration processor 110 may alter the number of TX and Receive (RX) chains enabled for the radios 140, alter the operation of a Universal Serial Bus (USB) component of the AP 100, alter the operation of an External (Ext) module of the AP 100, alter the operation of a Multigigabit (mGig) component of the AP 100, and the like. The system configuration processor 110 disabling and/or downgrading AP features may cause the AP 100 to use less power, and the system configuration processor 110 enabling and/or upgrading AP features may cause the AP to use more power. Thus, the system configuration processor 110 may cause the AP 100 to operate according to a PoE budget by altering the operation of features of the AP 100.

The system configuration processor 110 may determine the PoE budget by determining which standard the AP 100 may be operating under. For example, if the AP 100 is operating under the IEEE 802.3bt standard, the system configuration processor 110 may determine that the AP 100 has a PoE budget of 51-60 W. If the AP 100 is operating under the IEEE 802.3at standard, the system configuration processor 110 may determine that the AP 100 has a PoE budget of 25.5 W. If the AP 100 is operating under the IEEE 802.3af standard, the system configuration processor 110 may determine that the AP 100 has a PoE budget of 13.8 W. Additionally, the system configuration processor 110 may determine that the AP 100 is operating according to other standards or configurations and determine an associated PoE budget.

The system configuration processor 110 may automatically configure the AP 100 based on inputs received that indicate to the system configuration processor 110 which features may be operating. The system configuration processor 110 may determine how to automatically configure the AP 100 based on the PoE budget, the input of an entity that owns, operates, or otherwise controls the AP 100, based on the input of clients that communicate with the AP 100, and/or based on the input of the AP 100 itself. As used herein, input may mean the actions, operations, identities, operations, and the like of the entity, clients, and the AP 100. For example, input may be the standard the AP 100 is operating under, devices connected to the AP 100 by the entity, features enabled by the entity in a Radio Resource Management (RRM) interface, antenna deployment, client device types, client distribution, client device capabilities, client communications, the operating environment of the AP 100, the operating efficiency of the AP 100, and the like. Thus, the system configuration processor 110 may consider the different inputs from the entity, the clients, and the AP 100 to determine a configuration for the AP 100 to operate under.

The system configuration processor 110 may continuously perform an evaluation of the inputs associated with the AP for changes to alter the configuration of the AP 100 continuously as needed. The system configuration processor 110 may also periodically (e.g., every minute, every hour, every day, every week, etc.) evaluate the different inputs for changes to alter the configuration of the AP 100 periodically. When the system configuration processor 110 periodically evaluated the inputs, the system configuration processor 110 may evaluate certain inputs more frequently than others based on an expected frequency of changes to the inputs. The system configuration processor 110 may also trigger the evaluation based on a change to the AP 100, such a power configuration change, changing to a different standard, a new client-data rate set, and the like. The evaluation may include the operations performed by the system configuration processor 110, the entity input processor 112, the client input processor 114, and the device input processor 116 described herein.

The system configuration processor 110 may implement a process to perform the evaluation of the different inputs and to determine a configuration for the AP 100. The process may compute a preferred configuration based on one or more of the inputs to meet the AP's 100 PoE budget, including inputs from the entity, the clients, and the operation of the AP 100 for example. The process may assign weights to the different inputs to assign certain inputs more or less weight when calculating the configuration of the AP 100. The process may also consider the AP features that are being used and/or capable of being used and determine to disable or downgrade the features that are not being used/ and or capable of being used before determining to disable or downgrade features that are being used and/or capable of being used.

The entity input processor 112 may determine entity inputs (i.e., inputs from the entity associated with the AP 100). The entity input processor 112 may determine if devices are connected to the AP 100, such as a device connected to a USB component of the AP 100 or a device connected to an Ext module of the AP 100, for example. Thus, the entity input processor 112 may determine if the USB component and/or the Ext module are being used and likely should be enabled when possible or if the USB component and/or the Ext module are not being used and likely can be disabled by the system configuration processor 110 without interfering or otherwise altering the operation of the AP 100.

The entity input processor 112 may also determine AP features selected to be enabled or otherwise enabled by the entity, such as in a RRM interface. For example, the entity may enable Wi-Fi 5 dual band operation, tri band operation, a TX chain preference (e.g., 1 band, 2 band, 4 band), a throughput preference (e.g., data rate, channel width, the number of antennas or spatial streams) based, for example, on a selection via a Modulation Coding Scheme (MCS) index, and the like. Therefore, the entity input processor 112 may determine AP features the entity wishes to be enabled, and the system configuration processor 110 may determine which features of the AP 100 to alter based on the entity preferences. For example, the system configuration processor 110 may determine to disable an AP feature that the entity has not selected before an AP feature that the entity has selected.

The entity input processor 112 may also determine the antenna configuration of the AP 100 (e.g., the number and/or type of external antennas that may be connected to the AP 100) to determine the range of the AP 100 based on RX Start of Packet (RX-SOP) thresholds that are set. Thus, the system configuration processor 110 may determine to alter features of the AP 100 based on the range of the AP 100. For example, the system configuration processor 110 may disable or downgrade AP features that cannot be used or otherwise do not improve the operation of the AP 100 due to the determined range of the AP 100.

The entity input processor 112 may additionally determine if features of the AP 100 are incompatible with other Application Programming Interfaces (APIs) and/or systems that are deployed in the same field as the AP 100. The system configuration processor 110 may disable or downgrade AP features that are incompatible with the APIs and/or systems because they may not be able to be used.

The client input processor 114 may determine client inputs (i.e., inputs from the clients that communicate or otherwise interface with the AP 100). The clients may be distributed randomly at varying distances within the range of the AP 100. The client input processor 114 may determine groups of clients based on the distances from the AP 100. For example, the client input processor 114 may determine a near group and a far group. Thus, the system configuration processor 110 may determine to set RF power of the radios 140 to a higher power when transmitting to clients in the far group and a lower power when transmitting to the clients in the near group.

The client input processor 114 may determine the total number of clients connected to each radio of the radios 140 and whether the radio is operating at 2.4 GHz, 5 GHz, 6 GHz, and the like. For each client, the client input processor 114 may determine a link budget that identifies the power necessary to transmit to the client. The client input processor

114 may determine a link budget based on the AP's TX power and supported throughput, defined by the MCS index selection for example.

Figure 2:
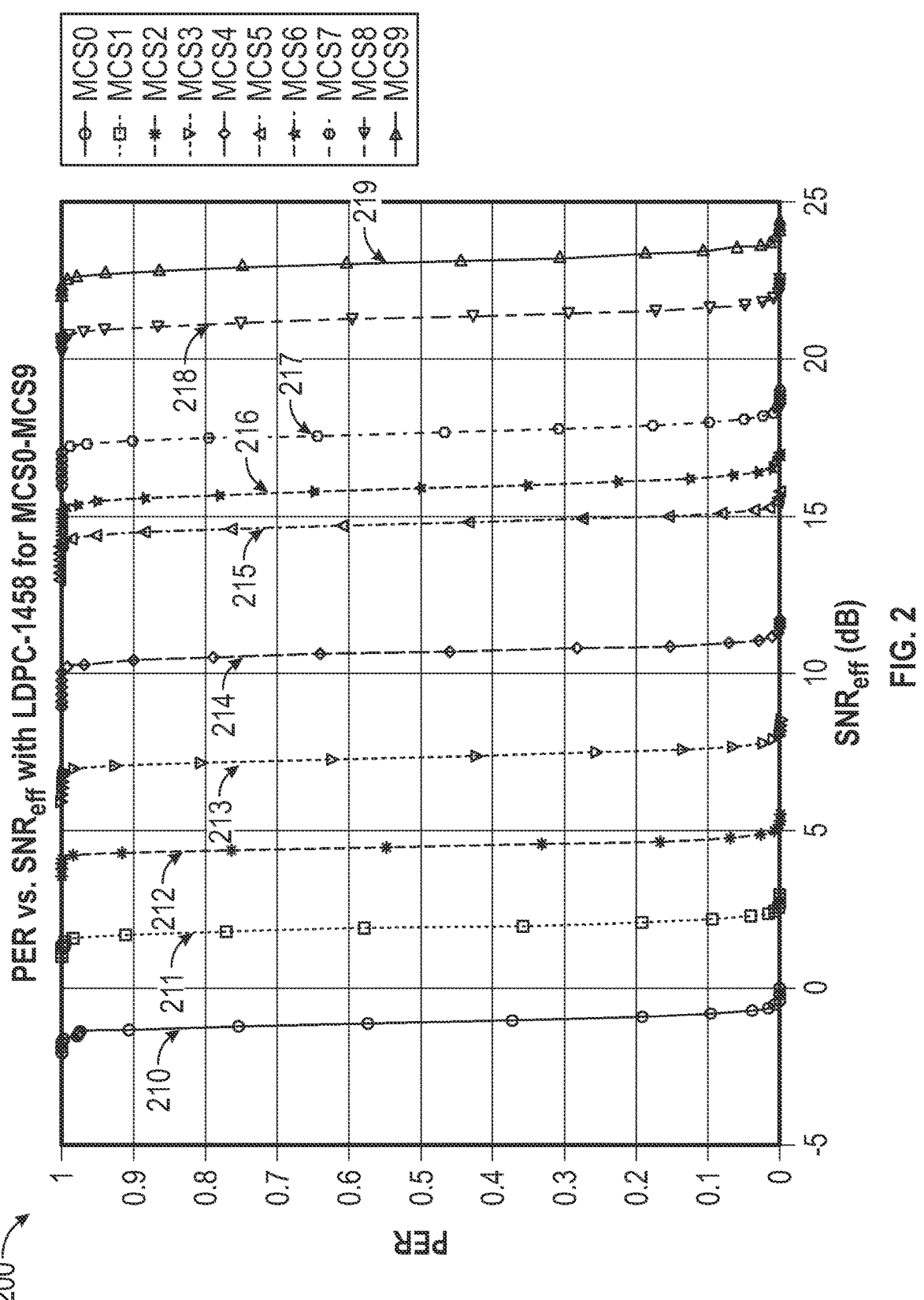
FIG. 2 is a graph for calculating a link budget.

FIG. 2 is a graph 200 for calculating the link budget. The graph 200's x-axis values may be a Signal-to-Noise (SNR) efficiency and the y-axis values may be a Packet Error Rate (PER). The graph 200 may include the value MCS0 210, MCS1 211, MCS2 212, MCS3 213, MCS4 214, MCS5 215, MCS6 216, MCS7 217, MCS8 218, and MCS9 219. For example, MCS0 210 may equate to a value of 0 selected for the MCS index. TX power may increase 1.5 dB when the MSC index value increases by 1 (e.g., MCS1 211 through MCS2 212), as shown by the graph 200. Therefore, the client input processor 114 may apply a linear translation between the MSC index value and the power.

Referring back to FIG. 1, the client input processor 114 may determine the range of the AP 100 based on, for example, RX-SOP thresholds and features of the AP 100 such as Orthogonal Frequency-Division Multiple Access (OFDMA) capabilities and Multi-User, Multiple Input, Multiple Output (MU-MIMO) capabilities. The client input processor 114 may then determine a radio configuration (e.g., TX power, the number of chains for the radio, spatial streams) for each radio of the radios 140 based on the determined distribution of clients connected to each radio that are in each grouping (e.g., the close group and the far group), the link budget for the clients connected to the radio, and the available power at PD (e.g., based on the PoE budget). For example, a first radio may be operating with 4×4 chain capabilities and have a client distribution that is all in a near grouping with the clients linked at MCS 7 and 2 Spatial Streams (SS). The client input processor 114 may determine the link budget (the TX power needed to sustain the link to the clients) and determine that the radio can be switched from the 4×4 chain to a 2×2:2SS chain, therefore reducing the power needed to transmit to the clients. The system configuration processor 110 may then switch the first radio from the 4×4 chain to the 2×2:255.

The AP 100 features and the AP 100 components may operate at a duty cycle (e.g., the percentage of time power is used for an AP feature), such as each radio of the radios 140. For example, the AP 100 may be operating at an 80% duty cycle with all AP features of the IEEE 802.11ax standard turned on, along with a Central Processing Unit (CPU) operating at 75-80% of maximum power. The client input processor 114 may determine the duty cycle of packets (e.g., Physical Layer Protocol Data Units (PPDU)) that the AP 100 and/of the radios 140 are scheduling. The client input processor 114 may determine the configuration of the AP based on the duty cycle of the packets and based on the available power at PD. Thus, the system configuration processor 110 may determine the power needed to transmit the packets without assuming each radio is operating 100% of the time, and the system configuration processor 110 may raise or lower assumed usage of the PoE budget for sending the packets.

The device input processor 116 may determine device inputs, inputs from the AP 100 itself (e.g., the hardware of the AP 100). The device input processor 116 may determine the operating frequency (e.g., switching frequency) of the AP 100 and/or components of the AP 100 to determine the expected efficiency of the AP 100 and/or the components. The device input processor 116 may also determine an operating frequency for the AP 100 and the components to improve the efficiency of the AP 100. The device input processor 116 may include a Power Management Integrated Circuit (PMIC) to determine a lower point of distribution of operating frequency to improve the efficiency of the AP 100 while keeping noise and/or ripple at acceptable levels. The device input processor 116 may determine the frequency based on filtering capabilities of the AP 100 (e.g., filtering noise and/or ripple). The device input processor 116 may also determine the frequency based on losses caused by components of the AP 100 (e.g., inductors, capacitors, resistors). Once the device input processor 116 determines an operating frequency for the AP 100 to operate at, the system configuration processor 110 may cause the AP 100 to operate at the determined operating frequency.

The device input processor 116 may also monitor the operating temperature of the AP 100 by receiving temperature readings from the temperature sensor 120. The device input processor 116 may determine the internal temperature and/or the ambient temperature around components of the AP 100. The device input processor 116 may determine to change the operating frequency of the AP 100 and/or components of the AP 100 based on the temperatures.

AP Power Improvement

The radios 140 may have a TX power limit when operating. The power limits may cause the AP radios to limit power, particularly when operating at edge bands. For example, TX power may be limited at edge bands to ensure TX spectrums falling outside of an Unlicensed National Information Infrastructure (UNII) band are within regulator restricted band limits (e.g., FCC limit: −41.25 dBm plus the number of paths per chain plus antenna gain, ETSI limit: −30 dBm per 1 MHz). The RF power processor 130 may be an adaptive RF front end that may improve the TX power of radios, particularly for edge bands, while staying within regulator restricted band limits. The RF power processor 130 may improve TX power by determining an adaptive power amplifier linearity based on the required performance of the AP radios (e.g., the radios 140) operating on the band and/or the operational frequency of the power amplifiers of the radios 140. The RF power processor 130, via the linearity processor 132, may determine the required performance on the band and the operational frequency of the power amplifiers using the TX power per path for the radios 140 and antenna gain.

The AP 100 may operate on a band with channels 1 through 11. For mid-channels (e.g., channel 2 through 10), the linearity processor 132 may set the power amplifier linearity at a fixed operating point and a Voltage Common Collector (Vcc) of the power amplifier. For example, the linearity processor 132 may set the power amplifier linearity at a point that meets the requirements for the data rates, bandwidth, Error Vector Magnitude (EVM), and the like of the radio operating on the mid-channel. The linearity processor 132 may set the power amplifier linearity so the radios 140 may transmit with the maximum TX power possible.

For edge channels (e.g., channel 1 and channel 11), the linearity processor 132 may automatically adjust the power amplifier linearity point by automatically adjusting the Vcc of the power amplifier. For example, the linearity processor 132 may adjust the power amplifier linearity at a point that meets the requirements for the data rates, bandwidth, EVM and the like of the radios 140 operating on an edge band. The linearity processor 132 may set the power amplifier linearity to adjust the Vcc of the power amplifier so the radios 140 may transmit with the maximum TX power possible, higher than the edge bands would normally be able to operate. Thus, the linearity processor 132 may monitor the operation of the radio to detect operational changes and adjust the Vcc of the power amplifier based on the operational changes.

Therefore, the linearity processor 132 may adjust the power amplifier linearity of the radio to a new operating point.

Figure 3:
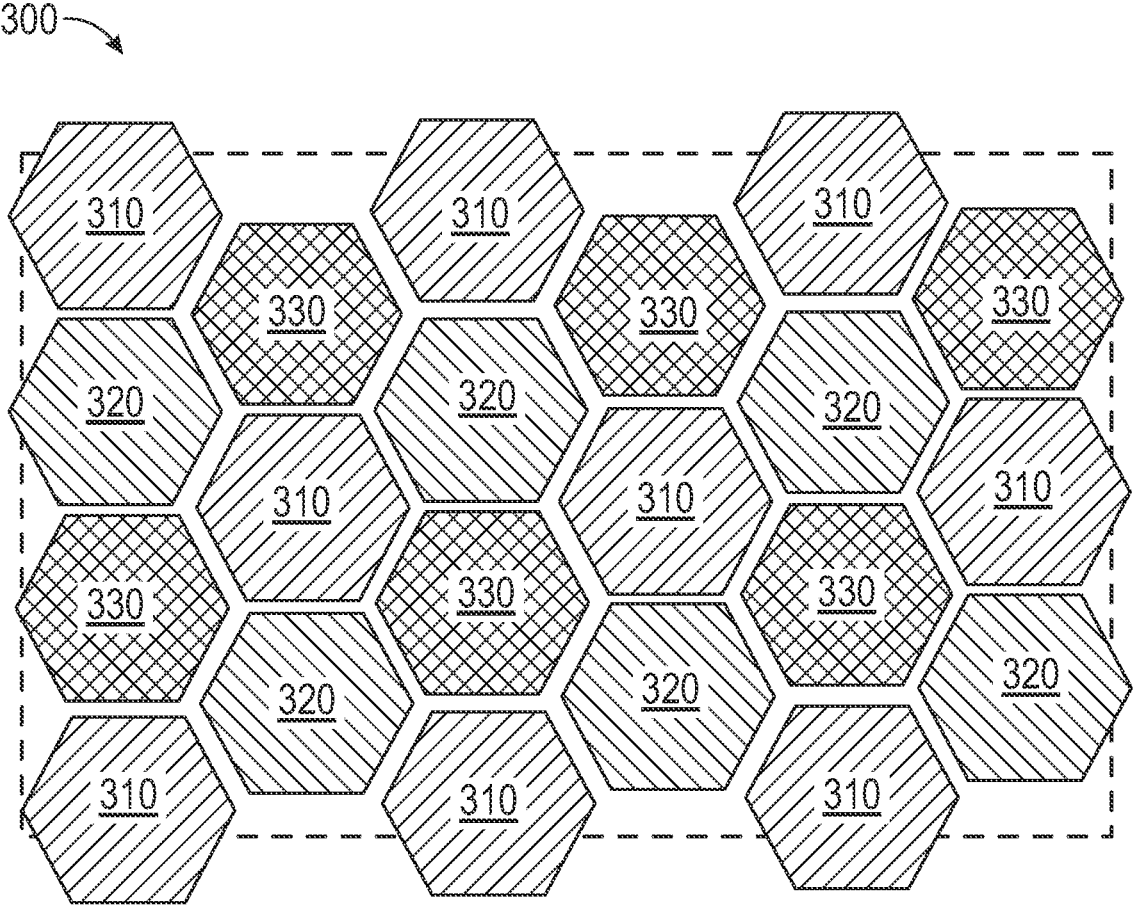
FIG. 3 is a diagram of an AP deployment for providing power improvement on edge band channels.

FIG. 3 is a diagram of an AP deployment 300 for providing power improvement on edge band channels. The AP deployment 300 may include mid-channel APs 310, high-channel APs 320, and low-channel APs 330. The AP deployment 300 may be a honeycomb structure.

The mid-channel APs 310 may operate on a mid-channel band, channel 6 for example. The high-channel APs 320 may operate on a high-channel edge band, channel 11 for example. The low-channel APs 330 may operate on a low-channel edge band, channel 1 for example. The RF power processor 130 may automatically control the power amplifier linearity point of the high-channel APs 320 and the low-channel APs 330, by performing the operations described above for example. Therefore, the mid-channel APs 310, the high-channel APs 320, and the low-channel APs 330 may not interfere with the APs of different channels and may not interfere with APs on the same channel while the high-channel APs 320 and the low-channel APs 330 operate at a maximum TX power because of the RF power processor 130 improving the TX power of the APs while staying within regulator restricted band limits and the deployment.

The RF power processor 130 may also automatically control, via the filter processor 134, the filter system 150 for TX and RX. The filter system 150 may be used on a common antenna port to improve TX power for edge bands, with band edge skirts for example. There may be a filter system 150 for each antenna connected to the AP 100.

FIG. 4 is a block diagram of the RF power processor 130 and the filter system 150 for providing power improvement on band edge channels. The filter system 150 of the RF power processor 130 may include a first amplifier 400 (e.g., a power amplifier), a first switch 402 (e.g., a Double Pole Double Throw (DPDT) switch), a filter 404 (e.g., a Bulk Acoustic Wave (BAW) filter), a second switch 406 (e.g., a Single Pole Double Throw (SPDT) switch), and a second amplifier 408 (e.g., a Low-Noise Amplifier).

The filter processor 134 may operate the filter system 150 by performing path selection. The filter processor 134 may perform path selection by determining for a TX to pass through the filter 404 or to not pass through the filter 404 and/or determining for a RX to pass through the filter 404 or to not pass through the filter 404. For example, the filter processor 134 may cause the first switch 402 to send a TX to the filter 404 or directly to the second switch 406, therefore sending the TX directly to an antenna. Similarly, the filter processor 134 may cause the second switch 406 to pass a RX received from the antenna to the filter 404 or directly to the first switch 402.

The filter processor 134 may automatically determine path selection based on the operation of the radios 140. For example, the filter processor 134 may determine that RX and/or TX need to pass through the filter 404 for higher attenuation to operate on band edge channel depending on domain and/or regulatory limits, to improve out of band rejection on RX paths, or to lower RX path, thereby improving RX sensitivity. The filter processor 134 may determine that a TX should not pass through the filter when the unfiltered TX would still be within regulator limits, lowering power losses and therefore allowing a higher TX power. Thus, the filter processor 134 may allow for higher TX power when able without drawing more power or interfering with other bands.

Methods

Figure 5:
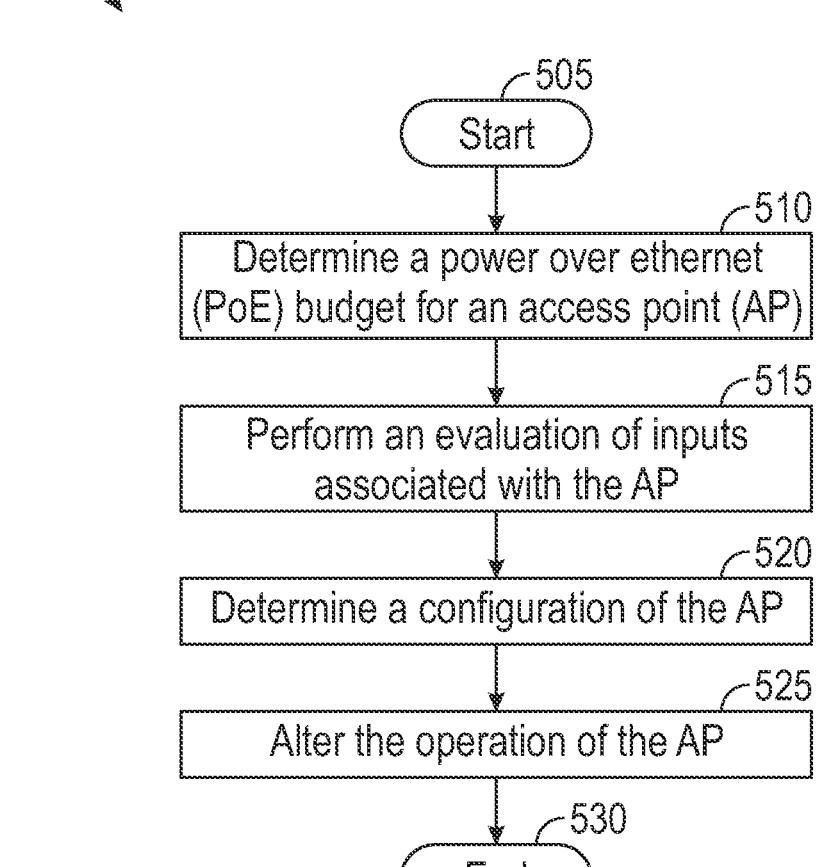
FIG. 5 is a flow chart of a method for providing automatically changing AP system configurations.

FIG. 5 is a flow chart of a method 500 for providing automatically changing AP system configurations. The method 500 may begin at starting block 505 and proceed to operation 510. In operation 510, a PoE budget for an AP 100 may be determined. For example, the system configuration processor 110 may determine the PoE budget of the AP 100, based on the standard the AP 100 is operating under for example.

In operation 515, an evaluation of inputs associated with the AP may be performed. For example, the system configuration processor 110, including the entity input processor 112, the client input processor 114, and the device input processor 116, may perform the evaluation. The evaluation may include any of the operations described above with respect to FIG. 1, including determining an entity input from an entity associated with the AP 100, determining a client input from a client interfacing with the AP 100, and/or determining a device input from the AP 100.

In operation 520, a configuration of the AP may be determined. For example, the system configuration processor 110 may determine the configuration of the AP 100 based on the PoE budget determined in operation 510, and any of the inputs evaluated in operation 515, including entity inputs, client inputs, and/or device inputs.

In operation 525, the operation of the AP may be altered. For example, the system configuration processor 110 may alter the operation of the AP 100 based on the configuration. The system configuration processor 110 may alter the operation of the AP 100 by enabling, disabling, upgrading, and/or downgrading features of the AP, such as the features described above with respect to FIG. 1. The method 500 may conclude at ending block 530.

Figure 6:
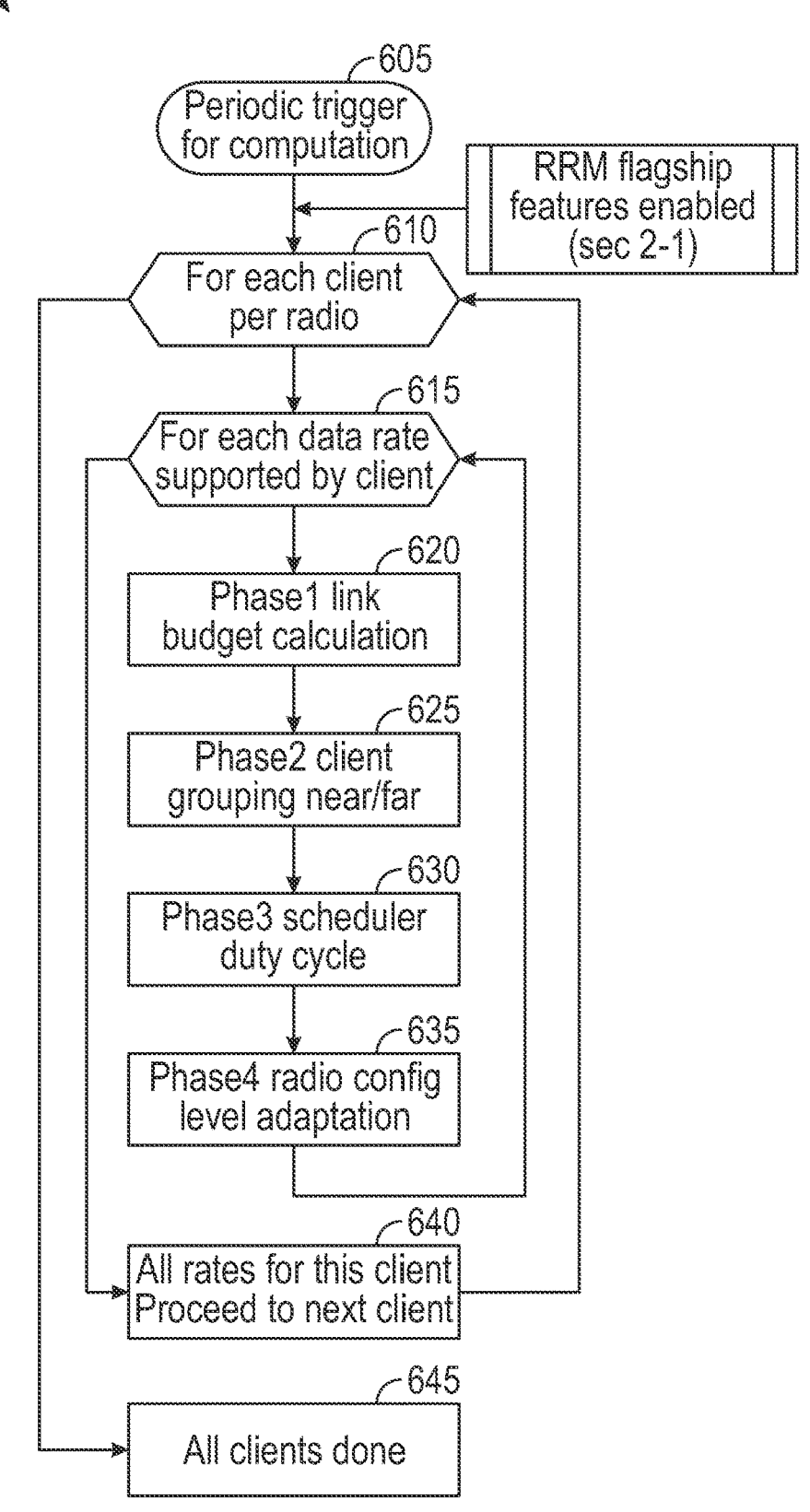
FIG. 6 is a flow chart of a method for providing automatically changing AP system configurations by determining client input.

FIG. 6 is a flow chart of a method 600 for providing automatically changing AP system configurations by determining client input. For example, the method 600 may be performed as part of operation 515 in method 500. The method 600 may begin at starting block 605 and proceed to decision 610. In decision 610, it may be determined if there are any clients interfacing with an AP to be evaluated. For example, the client input processor 114 may determine if there are any clients interfacing with the AP 100 via the radios 140 to be evaluated. If there is a client to be evaluated, the method 600 may proceed to decision 615. When there are no clients remaining to be evaluated, the method 600 may proceed to ending block 645.

In decision 615, it may be determined if there is a data rate supported by the client to be evaluated. Each client may support one or more data rates. For example, the client input processor 114 may determine if there is a data rate to be evaluated of the client being evaluated. When the client input processor 114 determines there is a data rate to be evaluated, the method 600 may proceed to operation 620. When there are no more data rates supported by the client to be evaluated, the method 600 may proceed to client ending block 640 and then proceed back to decision 610 to determine if there is another client to be evaluated.

In operation 620, a link budget of the client may be determined, by the client input processor 114 for example. The client input processor may determine the link budget according to the processes described above with respect to FIG. 1.

In operation 625, the group the client is in may be determined. For example, the client input processor 114 may determine the group the client is in based on the client's distance from the AP 100. In operation 630, the duty cycle of TX to the client is determined, for example by the client input processor 114.

In operation 635, a radio configuration may be determined. For example, the client input processor 114 may determine the radio configuration based on the link budget, the client group, and/or the duty cycle of TX to the client. For example, the client input processor 114 may determine that features of the radio of the radios 140 that is communicating with the client may be enabled, disabled, downgraded, and/or upgraded. For example, the radio may be operating using a 4×4 chain and may be downgraded to a 2×2 chain while still being able to communicate with the client. Each link budget, client grouping, and duty cycle of the clients interfacing with a radio may be used by the client input processor 114 to determine the radio configuration. The method may proceed from operation 635 to decision 615 to determine if there is another data rate supported by the client to be evaluated.

FIG. 7 is a flow chart of a method 700 for providing power improvement on edge band channels. The method 700 may begin at starting block 705 and proceed to operation 710. In operation 710, a required performance of a radio operating on an edge band channel may be determined. For example, the linearity processor 132 may determine the required performance of a radio (e.g., one of the radios 140) operating on an edge band channel. In operation 715, an operational frequency of a power amplifier of the radio may be determined, for example by the linearity processor 132.

In operation 720, a power amplifier linearity of the radio may be set to an operating point. For example, the linearity processor 132 may set the power amplifier linearity of the radio to an operating point by setting a Vcc of the power amplifier to a value based on the required performance and the operational frequency. In operation 725, the operation of the radio may be monitored to detect an operational change of the radio, for example by the linearity processor 132. In operation 725, the power amplifier linearity of the radio may be adjusted to a new operating point. For example, the linearity processor 132 may adjust the power amplifier linearity of the radio to a new operating point by setting the Vcc of the power amplifier to a new value based on the operational change. The method 700 may conclude at ending block 730.

Figure 8:
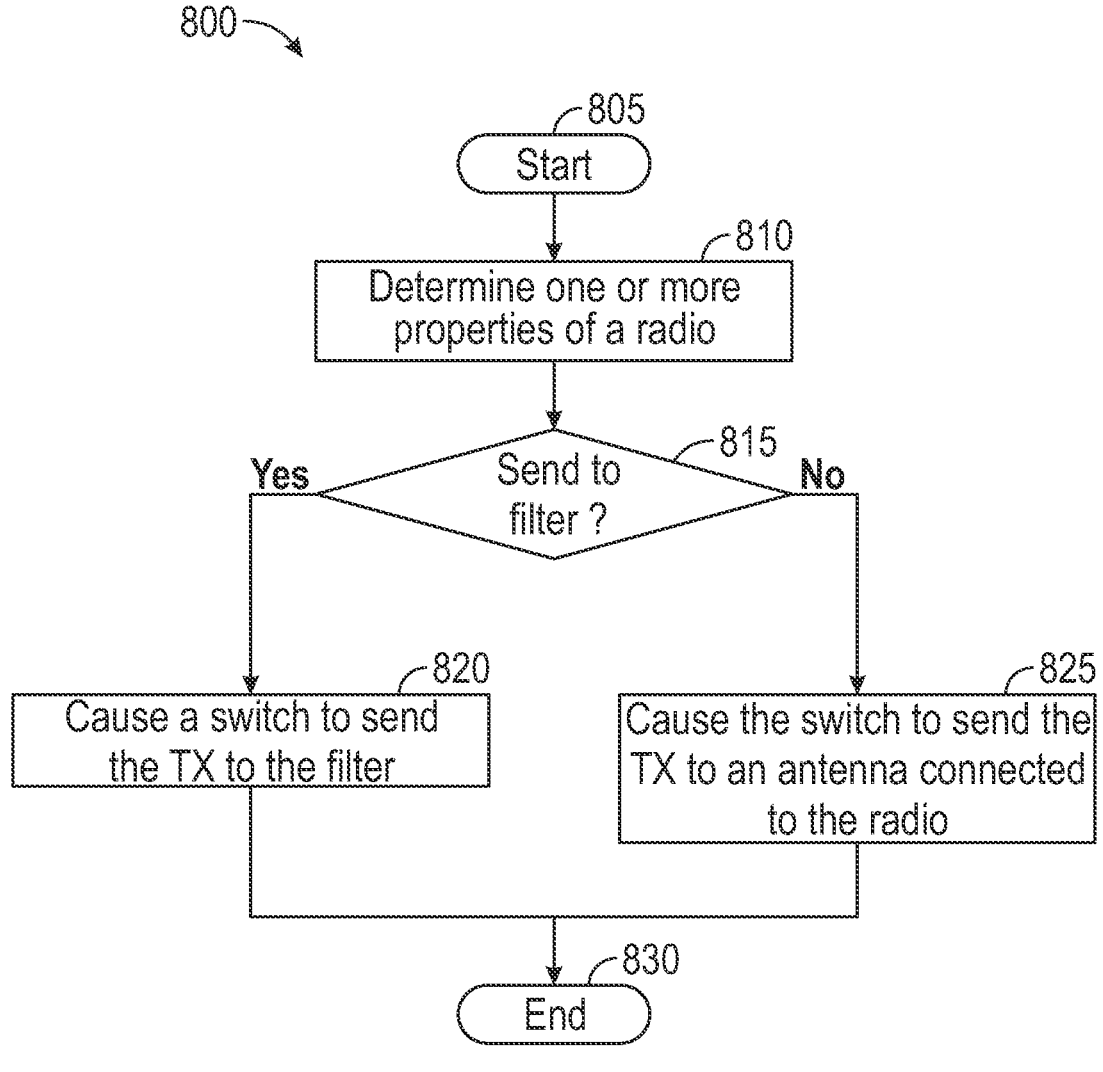
FIG. 8 is a flow chart of a method for providing power improvement on edge band channels by automatically filtering a Transmit (TX)

FIG. 8 is a flow chart of a method 800 for providing power improvement on edge band channels by automatically filtering a TX. The method 800 may begin at starting block 805 and proceed to operation 810. In operation 810, one or more properties of a radio may be determined, by the filter processor 134 for example. In operation 815, it may be determined if a TX by the radio should pass through a filter based on the one or more properties.

When the TX should pass through the filter the method 800 may proceed to operation 820. In operation 820, a switch may be caused to send the TX to the filter. For example, the filter processor 134 may cause the switch to send the TX to filter. The filter processor 134 may cause the switch to send the TX to the filter by causing the switch to be in the state that connects the TX generator of the radio to the filter.

When the TX should not pass through the filter the method 800 may proceed to operation 825. In operation 825, the switch may be caused to send the TX to an antenna connected to the radio. For example, the filter processor 134 may cause the switch to send the TX to the antenna. The filter processor 134 may cause the switch to send the TX to the antenna by causing the switch to be in the state that connects the TX generator of the radio to the antenna. The method 800 may conclude at ending block 830.

Figure 9:
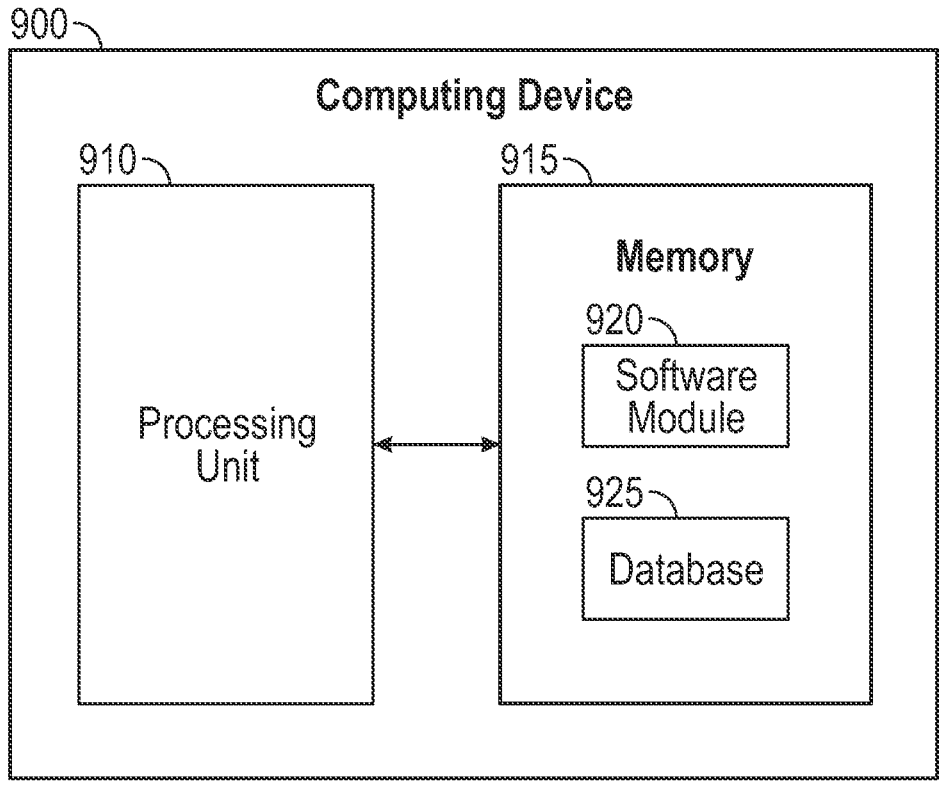
FIG. 9 is a block diagram of a computing device.

FIG. 9 is a block diagram of a computing device 900. As shown in FIG. 9, computing device 900 may include a processing unit 910 and a memory unit 915. Memory unit 915 may include a software module 920 and a database 925. While executing on processing unit 910, software module 920 may perform, for example, processes for providing network traffic interference detection and management as described above with respect to FIG. 1, FIG. 2, FIG. 3, FIG. 4, FIG. 5, FIG. 6, FIG. 7, and FIG. 8. Computing device 900, for example, may provide an operating environment for the AP 100, the system configuration processor 110, the entity input processor 112, the client input processor 114, the device input processor 116, the temperature sensor 120, the RF power processor 130, the linearity processor 132, the filter processor 134, the radios 140, the filter system 150, the mid-channel APs 310, the high-channel APs 320, the low-channel APs 330, and/or any other system described herein. The AP 100, the system configuration processor 110, the entity input processor 112, the client input processor 114, the device input processor 116, the temperature sensor 120, the RF power processor 130, the linearity processor 132, the filter processor 134, the radios 140, the filter system 150, the mid-channel APs 310, the high-channel APs 320, the low-channel APs 330, and/or any other system described herein may operate in other environments and are not limited to computing device 900.

Computing device 900 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 900 may comprise any computer operating environment, such as hand-held devices, multiprocessor systems, microprocessor-based or programmable sender electronic devices, minicomputers, mainframe computers, and the like. Computing device 900 may also be practiced in distributed computing environments where tasks are performed by remote processing devices. The aforementioned systems and devices are examples, and computing device 900 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 900 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
determining a Power over Ethernet (PoE) budget for an Access Point (AP), wherein determining the PoE budget for the AP comprises determining a standard of a plurality of standards the AP is operating under, and wherein each of the plurality of standards comprises an associated PoE budget;
performing an evaluation of inputs associated with the AP, the evaluation comprising any one of:
(i) determining an entity input from an entity associated with the AP,
(ii) determining a client input from a client interfacing with the AP,
(iii) determining a device input from the AP, or
(iv) any combination of (i)-(iii);
determining a configuration of the AP based on any one of (v) the entity input, (vi) the client input, (vii) the device input, or (viii) any combination of (v)-(vii) to meet the PoE budget; and
altering an operation of the AP based on the configuration, wherein altering the operation of the AP based on the configuration comprises determining an AP feature of the AP to alter based on entity preference, and wherein altering the operation of the AP based on the configuration comprises switching at least one radio from a first chain to a second chain to reduce an AP power.

2. The method of claim 1, further comprising:
detecting a change in the inputs associated with the AP;
determining a new configuration of the AP based on the change; and
altering the operation of the AP based on the new configuration.

3. The method of claim 1, further comprising periodically performing the evaluation to determine a change in the inputs.

4. The method of claim 1, further comprising continuously performing the evaluation to determine a change in the inputs.

5. The method of claim 1, wherein determining the entity input from the entity associated with the AP comprises any one of (i) determining a device is connected to the AP, (ii) determining an AP feature is selected to be enabled by the entity, (iii) determining an antenna configuration of the AP, (iv) determining a feature is incompatible with a system deployed in the same field as the AP, or (v) any combination of (i)-(iv).

6. The method of claim 1, wherein determining the client input from the client interfacing with the AP comprises:
determining a link budget of the client;
determining a distribution of clients interfacing with a radio of the AP, including the client; and
determining a grouping of the clients based on the distribution, wherein determining the configuration of the AP is based on the link budget and the grouping.

7. The method of claim 1, wherein determining the client input from the client interfacing with the AP comprises determining a duty cycle of packets the AP is scheduling, wherein determining the configuration of the AP is based on the duty cycle.

8. The method of claim 1, wherein determining the device input from the AP comprises any one of (i) determining an operating frequency of the AP, (ii) determining a loss caused by a component of the AP, (iii) determining an operating temperature of the AP, (iv) determining an ambient temperature of the AP, (v) or any combination of (i)-(iv).

9. The method of claim 8, wherein determining the configuration of the AP comprises determining a new operating frequency of the AP based on the device input.

10. A system comprising:
a memory storage; and
a processing unit coupled to the memory storage, wherein the processing unit is operative to:
determining a Power over Ethernet (PoE) budget for an Access Point (AP), wherein determining the PoE budget for the AP comprises determining a standard of a plurality of standards the AP is operating under, and wherein each of the plurality of standards comprises an associated PoE budget;
performing an evaluation of inputs associated with the AP, the evaluation comprising any one of:
(i) determining an entity input from an entity associated with the AP,
(ii) determining a client input from a client interfacing with the AP,
(iii) determining a device input from the AP, or
(iv) any combination of (i)-(iii);
determining a configuration of the AP based on any one of (v) the entity input, (vi) the client input, (vii) the device input, or (viii) any combination of (v)-(vii) to meet the PoE budget; and
altering an operation of the AP based on the configuration, wherein altering the operation of the AP based on the configuration comprises determining an AP feature of the AP to alter based on entity preference, and wherein altering the operation of the AP based on the configuration comprises switching at least one radio from a first chain to a second chain to reduce an AP power.

11. The system of claim 10, wherein the processing unit is further operative to:
detect a change in the inputs associated with the AP;
determine a new configuration of the AP based on the change; and
alter the operation of the AP based on the new configuration.

12. The system of claim 10, wherein the processing unit is further operative to periodically or continuously performing the evaluation to determine a change in the inputs.

13. The system of claim 10, wherein the processing unit being operative to determine the client input from the client interfacing with the AP comprises the processing unit being operative to:
determine a link budget of the client;
determine a distribution of clients interfacing with a radio of the AP, including the client; and
determine a grouping of the clients based on the distribution, wherein determining the configuration of the AP is based on the link budget and the grouping.

14. The system of claim 10, wherein the processing unit being operative to determine the client input from the client interfacing with the AP comprises the processing unit being operative to determine a duty cycle of packets the AP is scheduling, wherein the configuration of the AP is determined based on the duty cycle.

15. The system of claim 10, wherein the processing unit being operative to determine the configuration of the AP comprises the processing unit being operative to determining a new operating frequency of the AP based on the device input.

16. A non-transitory computer-readable medium that stores a set of instructions which when executed perform a method executed by the set of instructions comprising:

determining a Power over Ethernet (PoE) budget for an Access Point (AP), wherein determining the PoE budget for the AP comprises determining a standard of a plurality of standards the AP is operating under, and wherein each of the plurality of standards comprises an associated PoE budget;

performing an evaluation of inputs associated with the AP, the evaluation comprising any one of:
(i) determining an entity input from an entity associated with the AP,
(ii) determining a client input from a client interfacing with the AP,
(iii) determining a device input from the AP, or
(iv) any combination of (i)-(iii);

determining a configuration of the AP based on any one of (v) the entity input, (vi) the client input, (vii) the device input, or (viii) any combination of (v)-(vii) to meet the PoE budget; and altering an operation of the AP based on the configuration, wherein altering the operation of the AP based on the configuration comprises determining an AP feature of the AP to alter based on entity preference, and wherein altering the operation of the AP based on the configuration comprises switching at least one radio from a first chain to a second chain to reduce an AP power.

17. A non-transitory computer-readable medium of claim 16, further comprising:
detecting a change in the inputs associated with the AP;
determining a new configuration of the AP based on the change; and
altering the operation of the AP based on the new configuration.

18. A non-transitory computer-readable medium of claim 16, further comprising periodically or continuously performing the evaluation to determine a change in the inputs.

19. A non-transitory computer-readable medium of claim 16, wherein determining the client input from the client interfacing with the AP comprises:
determining a link budget of the client;
determining a distribution of clients interfacing with a radio of the AP, including the client; and
determining a grouping of the clients based on the distribution, wherein determining the configuration of the AP is based on the link budget and the grouping.

20. A non-transitory computer-readable medium of claim 16, wherein determining the client input from the client interfacing with the AP comprises determining a duty cycle of packets the AP is scheduling, wherein determining the configuration of the AP is based on the duty cycle.

* * * * *